(12) United States Patent
Taddei et al.

(10) Patent No.: US 10,294,132 B2
(45) Date of Patent: May 21, 2019

(54) APPARATUS AND METHOD TO REDUCE AND CONTROL RESISTIVITY OF DEIONIZED WATER

(71) Applicant: VEECO PRECISION SURFACE PROCESSING LLC, Horsham, PA (US)

(72) Inventors: John Taddei, Jim Thorpe, PA (US); Jonathan Yutkowitz, Horsham, PA (US)

(73) Assignee: VEECO PRECISION SURFACE PROCESSING LLC, Horsham, PA (US)

(*) Notice: Subject to any disclaimer, the term of this patent is extended or adjusted under 35 U.S.C. 154(b) by 779 days.

(21) Appl. No.: 14/884,595

(22) Filed: Oct. 15, 2015

(65) Prior Publication Data
US 2016/0137534 A1   May 19, 2016

Related U.S. Application Data

(60) Provisional application No. 62/081,770, filed on Nov. 19, 2014.

(51) Int. Cl.
*C02F 1/68* (2006.01)

(52) U.S. Cl.
CPC .......... *C02F 1/68* (2013.01); *C02F 2209/005* (2013.01); *C02F 2209/03* (2013.01); *C02F 2209/05* (2013.01)

(58) Field of Classification Search
CPC .. C02F 1/68; C02F 2209/03; C02F 2209/005; C02F 2209/05
See application file for complete search history.

(56) References Cited

U.S. PATENT DOCUMENTS

| | | | |
|---|---|---|---|
| 4,626,786 A * | 12/1986 | Bodecker | G01N 27/07 324/446 |
| 5,357,996 A | 10/1994 | Ioannides et al. | |
| 6,158,721 A | 12/2000 | Katou et al. | |
| 8,248,888 B1 | 8/2012 | Enzler et al. | |
| 2001/0009238 A1* | 7/2001 | Mosheim | C02F 1/008 210/746 |
| 2002/0063345 A1 | 5/2002 | Kambe et al. | |
| 2008/0006302 A1* | 1/2008 | Araki | H01L 21/0206 134/26 |
| 2010/0012590 A1 | 1/2010 | Slark | |
| 2011/0134716 A1* | 6/2011 | Seiwert | C02F 1/685 366/101 |
| 2012/0201929 A1 | 8/2012 | Guy et al. | |
| 2013/0136687 A1* | 5/2013 | Darr | B01D 11/0411 423/592.1 |

\* cited by examiner

*Primary Examiner* — Heidi R Kelley
*Assistant Examiner* — Akash K Varma
(74) *Attorney, Agent, or Firm* — Leason Ellis LLP

(57) ABSTRACT

An apparatus and method to convert high resistivity (18 MOhm/cm) deionized water into lower resistivity deionized water with a tight resistivity range. The apparatus is diminished in size to require less space, has an improved sensitivity resistivity probe to permit a lower operating range, an increased communication rate with updated control logic to permit holding tighter tolerances. The method is environmentally friendly in that it replaces the use of harsh chemistries and eliminates the generation of hazardous waste.

19 Claims, 2 Drawing Sheets

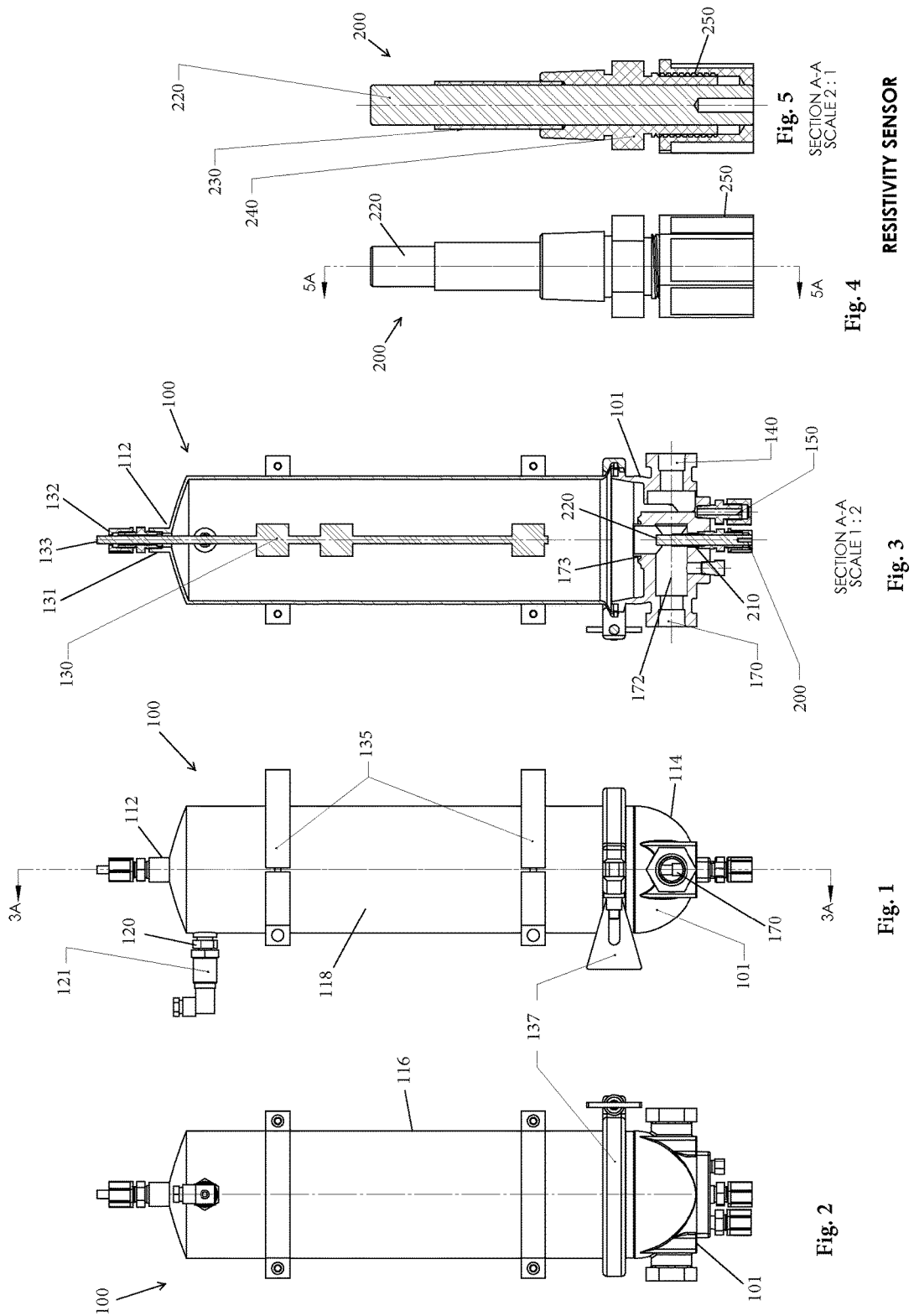

APPARATUS AND METHOD TO REDUCE AND CONTROL RESISTIVITY OF DEIONIZED WATER

CROSS-REFERENCE TO RELATED APPLICATION

The present application claims the benefit of U.S. patent application Ser. No. 62/081,770, filed Nov. 19, 2014, which is hereby incorporated by reference in its entirety.

TECHNICAL FIELD

This invention generally relates to an apparatus and method for reducing and controlling resistivity of deionized water (DI). More specifically, this invention relates to an improved apparatus and method for injecting controlled volumes of carbon dioxide into deionized water in a space efficient design and in an environmentally friendly fashion that permits holding lower nominal levels of resistivity within tighter tolerances and at increased flow rates.

BACKGROUND

Semiconductor manufacturing has historically used 18 MOhm/cm deionized water as a rinsing and cleaning fluid. Semiconductor manufacturers put water through a sequence of steps to remove particles and metal ions that would otherwise poison semiconductor devices. Once these impurities are removed from water the resistivity is typically raised to 18 MOhm/cm. DI water in many cases is used as a pressurized medium to remove particles from the surfaces of wafers. These particles would otherwise cause defects in the semiconductor devices on the wafers. The undesired side effect of pressurized dispense of deionized water on wafers is the build of static voltages and eventually electrostatic discharge (ESD). Many semiconductor devices are ESD sensitive and if voltages are permitted to build and then discharge, yield loss will occur.

The static voltages are created when a non-conductive fluid (such as 18 MOhm/cm DI water) aggressively contacts a non-conductive (or electrically isolated) surface (such as a wafer). The voltage built will be proportional to the aggressiveness (force) of the dispense and proportional to the resistivity of the fluid employed. The cleaning efficiency of the water dispense is also proportional to the force of the spray. This leads to the paradox of high pressure spray being required to remove particles from the wafer surface to increase yield, but high pressure spray causing static voltage to build to the point of discharge causing yield loss.

The industry initially worked around this issue by mixing in chemical agents, such as ammonium hydroxide, to increase the conductivity of the fluid. This was successful but not an environmentally friendly choice, required wastewater streams to be treated and was not an option for many structures that ammonium hydroxide would attack or corrode.

To avoid chemical attack from ammonium hydroxide, carbon dioxide was then employed to lower the resistivity of the DI water. Initial systems had crude controls (such as simply pressurizing tanks with carbon dioxide). These on\off $CO_2$ systems could not accurately maintain the upper resistivity level opening the possibility of ESD damage. Similarly they could not maintain the lower resistivity level which then required excessive quantities of $CO_2$ and opened conditions for carbonic acid to form.

These systems then evolved with more sophisticated controls that permitted holding resistivity levels in the 350 KOhm/cm range within tolerance of 200 KOhm/cm. This was a solution but the semiconductor industry continues to decrease the size of devices, which in turn is making devices more susceptible to ESD damage. The industry now requires lower levels of resistivity and tighter tolerances of control. The present applicant has responded to industry demands by developing an improved version of its DI water:CO2 mixing system. The new system creates low resistivity (150 KOhm/cm+\−50 KOhm/cm) deionized water on demand.

SUMMARY

In one embodiment, an apparatus is provided for discreetly (selectively) injecting carbon dioxide in 18 MOhm/cm DI to create 150 KOhm/cm DI water within a tight tolerance in an on demand. The apparatus consists of a pressure vessel with an 18 MOhm/cm DI water inlet port and a 150 KOhm/cm DI water exit port. There is another inlet port for pressurized carbon dioxide and a port for nitrogen inlet and a pressure transducer. Additional connections are present in the vessel for a level sensor and resistivity probe.

DI water is supplied to vessel until the liquid full sensor is satisfied. Software (processor/controller) controls the tank pressure by supplying nitrogen to the top of the tank. Pressure is monitored via pressure transmitter feedback (as a result of the output of the pressure transducer being fed to the processor/controller of the device). The resistivity of the DI water in the tank is monitored by the resistivity sensor (probe). When the measured resistivity is above the set point, carbon dioxide flows into the vessel. Carbon dioxide enters from the bottom of the tank and bubbles through the DI water. As the bubbles flow upward, the carbon dioxide dissolves into solution and lowers the resistivity of the DI water. When the measured resistivity is below the set point, the carbon dioxide flow is stopped (as by closing a valve associated with the inlet through which the carbon dioxide flows).

The device works in an on demand fashion permitting a smaller vessel and optimized plumbing package to be used and therefore requires less space. The resistivity sensor (probe) has increased low end resolution enabling set points at lower values than previous generations. The feedback and control loop are communicating at faster rates, which along with an enhanced control algorithm permit holding of tighter resistivity tolerances (e.g., 150 KOhm/cm+\−50 KOhm/cm).

BRIEF DESCRIPTION OF THE DRAWING FIGURES

FIG. 1 is a side elevation view of an apparatus configured to convert high resistivity deionized water into lower resistivity deionized water in accordance with one embodiment of the present invention;

FIG. 2 is another side elevation view of the apparatus of FIG. 1;

FIG. 3 is a cross-sectional view through the line 3-3 of FIG. 1;

FIG. 4 is a side elevation view of a resistivity sensor;

FIG. 5 is a cross-sectional view taken through the line 5-5 of FIG. 4.

DETAILED DESCRIPTION OF CERTAIN EMBODIMENTS

Figure 6:
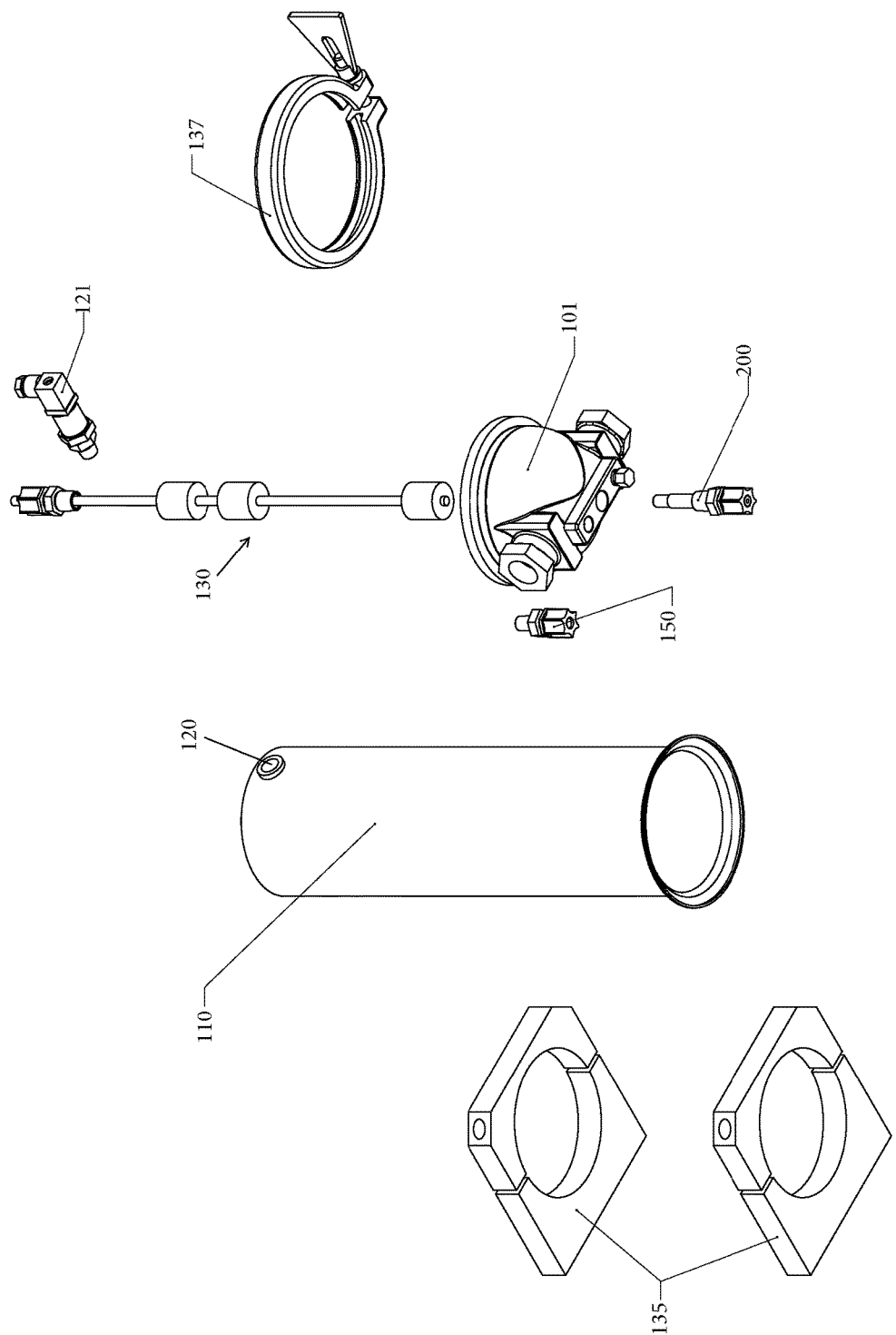
FIG. 6 is an exploded perspective view of the apparatus of FIG. 1.

Now referring to FIGS. 1-6, an apparatus 100 is provided for reducing the resistivity of a fluid.

In one exemplary embodiment, the present applicant has responded to industry demands by developing an improved DI water:$CO_2$ mixing device 100. The device 100 creates low resistivity (150 KOhm/cm+\−50 KOhm/cm) deionized water on demand. This overcomes the concerns associated with the prior art as previously mentioned.

It will be appreciated that while the fluid introduced into the device 100 can be water, it can also be other fluids that have similar requirements.

The device 100 can be thought of as being part of an overall DI water circuit which includes a source of DI water (not shown) and a piece of downstream equipment (not shown) such as a sprayer which disperses the DI water over a target surface (such as a wafer). It will be appreciated that the device 100 can be used in other applications as well in which there is a need for low resistivity DI water (or other fluid).

The device 100 includes a storage vessel 110 that has a first (top) end 112 and an opposing second (bottom) end 114. The vessel 110 also has a side wall 116 that defines an outer surface 118. The vessel 110 can take any number of different shapes including a cylindrical shape as shown and can be formed of any number of different materials including metal or plastic. In the illustrated embodiment, the vessel 110 is in the form of a tank or the like.

At the bottom end 114, the vessel 110 also includes a first inlet 140 for delivering a first fluid into the hollow interior of the vessel 110. The first inlet 140 can include any number of connectors and/or valve structures to selectively allow for introduction of the second fluid into the hollow interior of the vessel 110. For example, the first inlet 140 can be configured to receive a first fluid, in this case, the DI water, that is delivered into the hollow interior of the vessel 110. The first inlet 140 can be part of a manifold 101 which defines fluid flow paths for the fluids that are introduced into the vessel 110 and are discharged from the vessel 110. The manifold 101 thus has integral channel architecture including the inlets and outlet described herein.

As best shown in FIG. 6, the manifold 101 can be in the form of a bottom cap for mating to a main (base) portion of the vessel 110. The bottom cap (manifold) 101 can be coupled to the vessel 110 using conventional techniques including threadingly mating (screw fasten) the bottom cap 101 to the vessel 110. By being configured to mate with the bottom of the vessel 110, the inlets and outlet formed in the manifold 101 are positioned also at the bottom of the vessel 110 and thus fluids are introduced into the vessel 110 at the bottom thereof and also are withdrawn from the vessel 110 at the bottom of the vessel 110.

A valve is associated with the first inlet 140 for controlling the flow of the DI water into the vessel 110. For example, if the downstream equipment is not calling for DI water, then the valve associated with the first inlet 140 can be closed.

In accordance with the present invention, the vessel 110 also includes a second inlet 150 for selectively delivering carbon dioxide into the hollow interior of the vessel 110. The second inlet 150 can include any number of connectors and/or valve structures to selectively allow for introduction of the carbon dioxide into the hollow interior of the vessel 110. The second inlet 150 can be formed in the manifold that includes the first inlet 140. The carbon dioxide is delivered to the second inlet 150 using a conventional conduit, such as a tube.

As shown in FIG. 6, the second inlet 150 can be in the form of a nozzle structure that mates to the manifold (bottom cap) 101 such that the second inlet 150 is placed in fluid communication with one conduit of the manifold 101.

The first and second inlets 140, 150 are preferably disposed proximate to one another.

The manifold 101 including the first and second inlets 140, 150 is disposed at the bottom 114 of the vessel 110 proximate to the first inlet 140. Thus, both the DI water from a DI water source and the carbon dioxide are introduced to the vessel 110 at the bottom thereof at locations proximate one another.

Valves associated with one or more of the first and second inlets 140, 150 are configured for controlling the flow of the DI water and the carbon dioxide into the vessel 110. As described herein, the carbon dioxide is selectively delivered into the hollow interior of the vessel 110 for mixing with the DI water. The second inlet 150 is in fluid communication with the bottom end 114 of the vessel 110 to allow the carbon dioxide to enter at the bottom of the vessel 110 and bubble upward toward the top end 112 of the vessel 110. As the bubbles flow upward, the carbon dioxide dissolves into solution and lowers the resistivity of the DI water.

The vessel 110 also includes a first outlet (conduit) 170 that receives the carbonated DI water (with reduced resistivity) from the hollow interior of the vessel 110.

In the illustrated embodiment, the first inlet 140 and the first outlet 170 can be located opposite one another relative to the body of the vessel 110. The first outlet 170 can be in the form of a conduit that can include a connector and/or valve structure. As best shown in FIG. 3, the first outlet 170 is open along one side of the manifold 101 and is defined by a main conduit portion 172 that extends centrally within the manifold 101 and has a fluid entrance 173 that is centrally located in the manifold 101 and in direct communication with the center of the vessel 110. In this manner, the carbonated DI water in the vessel 110 flows into the entrance 173 (due to pressure in the vessel 110) and flows through the main conduit portion 172 to the exit of the outlet 170.

The first outlet 170 thus connects to an external conduit (tube) that fluidly connects to the downstream equipment (e.g., a sprayer) that is demanding such carbonated DI water. As shown, the first outlet 170 can be formed in the manifold that contains both the first and second inlets 140, 150.

At the top end 112 of the vessel 110, a third inlet 120 is formed and provides a fluid conduit into the hollow interior of the vessel 110. The third inlet 120 can include any number of connectors and/or valve structures to selectively allow for introduction of a third fluid into the hollow interior of the vessel 110. For example, the third inlet 120 is configured to receive a gas (a third fluid), such as nitrogen or the like, that is used to pressurize the contents of the vessel 110. The gas source can be located remote from the tank and the gas is delivered to the third inlet 120 using a conventional conduit, such as a tube.

The vessel 110 also has a pressure transducer (generally shown at 121) which is configured to monitor and measure the pressure within the hollow interior of the vessel 110. It will be appreciated that the pressure transducer 121, as well as some of the other components of the device 100, are part of a computer based system. The computer based system includes conventional components, such as a processor (controller) and memory for storing data, etc. The pressure transducer 121 is in communication with the processor and provide a feedback loop such that the processor is programmed such that when the output from the pressure transducer 121 is beneath (below) the threshold value, the processor instructs the valve associated with the third inlet 120 to open to allow flow of the gas (nitrogen) into the hollow interior of the vessel 110. This results in a pressure increase within the vessel 110. Conversely, when the output from the pressure transducer 121 is above the threshold value, the processor instructs the valve associated with the third inlet 120 to close to prevent additional gas from flowing into the hollow interior of the vessel 110. Based on the foregoing feedback loop, the pressure within the hollow interior of the vessel 110 is maintained within an acceptable range.

The pressure transducer 121 can be disposed within the third inlet 120.

The vessel 110 also includes a mechanism 130 for measuring the level of the contents (e.g., DI water) in the hollow interior of the vessel 110. In the illustrated embodiment, the mechanism 130 is in the form of an internal level sensor that is configured to detect the level (fluid level) of the contents (DI water) in the vessel 110. The level sensor 130 is inserted into the hollow interior of the vessel 110 by passing through an opening 131 formed in the top end 112 of the tank 110. A cap 132 can close off the opening 131.

The level sensor 130 can be in the form of an elongated sensor that is suspended within the interior of the vessel 110. A first end 133 is coupled to the top of the vessel or to the cap 132 to allow the sensor 130 to be centrally disposed in the interior of the vessel 110. The level sensor 130 is operatively connected to the main controller (processor) to provide real-time fluid level details (which in turn can dictate at what flow rate the DI water is introduced into the vessel).

One or more mounting brackets 135 and one or more clamps 137 can be provided for mounting the device 100 to a support structure.

In accordance with the present invention, a mechanism (means) 200 is provided for testing the resistivity of the DI water in the hollow interior of the vessel 110. The mechanism 200 can be in the form of a resistivity sensor which is configured to selectively sample the DI water and measure the resistivity of the DI water (i.e., the carbonated fluid within the vessel 110).

As is known, conductivity is the ability of a solution to conduct electric current. The principle by which instruments measures conductivity is simple—two plates (cells) are placed in the sample, a potential is applied across the plates and the current is measured. The potential is a 2.5 VDC applied to the probe. Conductivity (C) is determined from the voltage and current values according to Ohm's Law:

$$C(\text{siemens})=1/R=I(\text{amps})/E(\text{volts})$$

Since the charge on the ions in solution facilitates the conductance of electrical current, the conductivity of a solution is proportional to its ion concentration. The basic unit of measurement for conductivity is Siemens (S). Since cell geometry affects conductivity values, standardized measurements are expressed in specific conductivity units (S/cm) to compensate for variations in electrode dimensions. For most solutions this measurement unit is much too large and either μS/cm or mS/cm is used instead.

The corresponding terms for specific resistivity (R=1/C) are ohm-cm, Kohm-cm and Mohm-cm. Generally users of ultrapure water as well as DI water, as in the present case, prefer to use resistivity units of Mohmcm or Kohm-cm, because measurement in this unit tends to spread the scale out into the range of interest.

The resistivity sensor 200 is mounted through the opening in the vessel bottom (210) with the probe in the active area of the vessel 110. Any number of different techniques can be used to secure the sensor 200 within the active area. Accordingly the probe is always in the DI water within the vessel 110 to its positioning with the bottom cap.

As best shown in FIG. 3, the resistivity sensor 200 can be mounted in an opening that leads directly into the main conduit portion 172 of the outlet 170 and underneath the conduit entrance 173. In this manner, the resistivity sensor 200 is placed directly within the flow path of the DI water as it flows to the exit. By being positioned in axial alignment with the conduit entrance 173, the resistivity sensor 200 can be placed in closer proximity to or be physically disposed within the hollow interior of the main portion of the vessel 110. The manifold construction thus allows the resistivity sensor 200 to be located physically closer to the hollow interior of the vessel in which the DI water is located.

FIGS. 4-5 illustrate the construction of one exemplary resistivity sensor 200. The resistivity sensor 200 includes an elongated probe 220 (which can include first and second charged electrodes to measure the resistivity of fluid flowing there between), an insulating sleeve 230 that is disposed circumferentially around a length of the probe 220, and a fitting 240 that circumferentially surrounds one end of the sleeve 230 and the probe 220. This assembled structure formed of the probe 220, sleeve 230 and fitting 240 can be mated to a connector 250. The connector 250 allows for connection to a tube or the like for draining the sampled fluid.

As previously described 2.5 VDC is applied to the probe. The signal is returned off the housing wall (116). The entire housing is metal and therefore conductive, therefore the probe in older designs measured conductivity through the shortest path to the housing. Since the probe is mounted into the housing head, the shortest path was from the base of the probe to the bottom head. This resulted in a loss of accuracy and repeatability but was sufficient to do the job in the past. To meet tighter specifications the probe was re-designed. An electrical insulator (insulating sleeve 230) was designed into the probe base to ensure the shortest electrical path was now a greater distance. The present construction results in improved probe sensitivity.

As shown in FIG. 3, the resistivity sensor 200 is constructed such that the only exposed metal portion is the distal tip of the probe 220 and this exposed metal portion is accordingly positioned not only within the main conduit portion 172 of the outlet but is also positioned physically closer to the hollow interior of the vessel 110 as a result of being an imbedded part within the manifold. A portion of the insulating sleeve 230 is thus also disposed within the main conduit portion and in contact with the DI water but since the sleeve 230 is formed of plastic, this portion acts an insulator, thereby leaving the exposed metal distal tip as the active part of the probe (resistivity sensor) in contrast to the insulated base of the sensor.

FIG. 4 shows the resistivity sensor 200 in its assembled state. FIG. 5 is a cross-sectional view showing the construction of the resistivity sensor 200.

The output (measurements) of the resistivity sensor 200 is delivered to the processor (controller) associated with the device 100. The processor is configured such that when the resistivity of the DI water is below a predetermined threshold (a set point), the flow of carbon dioxide is stopped as by closing the valve associated with the second inlet 150. Similarly, when the resistivity of the DI water exceeds this threshold (the set point), carbon dioxide flows into the vessel as a result of the valve associated with the second inlet 150 being opened to deliver the carbon dioxide to the vessel 110. This measurement step is performed as part of a feedback loop that is controlled by the main processor/controller of the system.

In accordance with the present invention, the device 100 is configured and operated under operating conditions such that the resistivity value of the DI water being introduced into the vessel 110 is controllably reduced to a target level (e.g., resistivity within a target range). In one exemplary embodiment, the device 100 discreetly injects carbon dioxide in 18 MOhm/cm DI water to create 150 KOhm/cm DI water within a tight tolerance (e.g., (150 KOhm/cm+\−50 KOhm/cm)) in an on demand fashion. The first inlet 140 thus receives 18 MOhm/cm DI water and the first outlet 170 thus discharges 150 KOhm/cm DI water for consumption by the downstream equipment. It will be appreciated that the above values are merely exemplary and not limiting of the present invention. Instead, the present invention teaches a controllable device 100 that reduces the resistivity value of the incoming DI water, that is carbonated by injection of carbon dioxide, to a target resistivity value (or range) and in this case, the DI water is continuously carbonated until the measured resistivity reaches at or below the set point (at which time the flow of carbon dioxide is stopped) as discussed below.

The device 100 operates, at least in one typical operating mode, as follows:

DI water is supplied to vessel 110 until the liquid full sensor 130 is satisfied. Software (processor/controller) controls the tank pressure by supplying nitrogen to the top of the tank 110. Pressure is monitored via pressure transmitter feedback (as a result of the output of the pressure transducer 121 being fed to the processor/controller of the device). The resistivity of the DI water in the tank 110 is monitored by the resistivity sensor (probe) 200. When the measured resistivity is above the set point, carbon dioxide flows into the vessel 110. Carbon dioxide enters from the bottom of the tank and bubbles through the DI water. As the bubbles flow upward, the carbon dioxide dissolves into solution and lowers the resistivity of the DI water. When the measured resistivity is below the set point, the carbon dioxide flow is stopped (as by closing a valve associated with the inlet 150).

The device 100 works in an on demand fashion permitting a smaller vessel and optimized plumbing package to be used and therefore requires less space. The resistivity sensor (probe) 200 has increased low end resolution enabling set points at lower values than previous generations. The feedback and control loop are communicating at faster rates, which along with an enhanced control algorithm permit holding of tighter resistivity tolerances (e.g., 150 KOhm/cm+\−50 KOhm/cm).

Previous generation design employed a 3 gallon tank with a recirculation pump occupying 500% more space. To manufacture equivalent demand to the new design two tank\pump systems were required. The CO2 under injection with imbedded resistivity probe, as set forth in the present invention and described herein, is what permits the reduction in footprint (e.g., a 2 liter tank can be used). Accordingly, the new system (device 100) occupies some 10% of the volume of the old design.

Additional advantages achieved by the present device 100 include but are not limited to the following: (1) the apparatus is of reduced dimensions as compared to previous generation for equivalent capacity and requires less space; (2) the apparatus through use of improved sensitivity resistivity probe enables use of lower resistivity set points; (3) the apparatus through higher speed communication permits tighter control tolerance; (4) the apparatus through improved control logic achieves tighter control tolerance; (5) the apparatus through design of the injection vessel permits smaller footprint; (6) the apparatus through design of the vessel delivers tighter control; (7) the method of employing a small re-ionization vessel, carbon dioxide under introduction, high sensitivity resistivity probe, high speed parameter modeling and improved control algorithm yields a high capacity of reduced resistivity deionized water; (8) the method of employing a small re-ionization vessel, carbon dioxide under introduction, high sensitivity resistivity probe, high speed parameter modeling and improved control algorithm yields deionized water at a lower resistivity level; (9) the method of employing a small re-ionization vessel, carbon dioxide under introduction, high sensitivity resistivity probe, high speed parameter modeling and improved control algorithm yields deionized water at tighter resistivity tolerances; (10) the method is environmentally friendly by eliminating hazardous chemicals and waste, in favor of the use of repurposed carbon dioxide; (11) the method is environmentally friendly by eliminating the creation of hazardous waste; and (12) the method is environmentally friendly by eliminating use of fresh chemistry in favor of the use of repurposed carbon dioxide.

It is to be understood that the figures and descriptions of the present invention have been simplified to illustrate elements that are relevant for a clear understanding of the present invention, while eliminating, for the purposes of clarity, many other elements which may be found in the present invention. Those of ordinary skill in the pertinent art will recognize that other elements are desirable and/or required in order to implement the present invention. However, because such elements are well known in the art, and because such elements do not facilitate a better understanding of the present invention, a discussion of such elements is not provided herein.

What is claimed is:

1. An apparatus for reducing a resistivity of a first fluid comprising:
   a vessel;
   a bottom cap that is detachably coupled to an open end of the vessel so as to close off the open end and the bottom cap includes an integral manifold structure that has a first inlet formed integrally therein for receiving the first fluid; a second inlet formed integrally therein for selectively delivering a second fluid to the vessel for mixing with the first fluid to reduce the resistivity of the first fluid; and an outlet formed integrally therein for discharging the first fluid from the vessel; and
   a resistivity sensor that is received within the manifold of the bottom cap such that one end of the resistivity sensor is disposed within the outlet for measuring the resistivity of the first fluid being discharged from the vessel.

2. The device of claim 1, wherein the first fluid comprises deionized water.

3. The device of claim 1, wherein the second fluid comprises carbon dioxide.

4. The device of claim 1, wherein the vessel comprises a metal tank.

5. The device of claim 1, wherein the vessel includes an inlet for receiving a gas for pressurizing the vessel and a pressure transducer for measuring pressure within the vessel.

6. The device of claim 1, wherein the resistivity sensor is placed within an active area of the vessel in contact with the first fluid contained in the vessel.

7. The device of claim 6, wherein the resistivity sensor is operatively coupled to a controller that is also operatively coupled to a valve located along the second inlet, the controller being configured to open and close the valve and control flow of the second fluid into the vessel depending upon the output of the resistivity sensor.

8. The device of claim 7, wherein the first fluid comprises 18 MOhm/cm deionized water and the controller is configured to generate 150 KOhm/cm DI water by controlling the addition of carbon dioxide (the second fluid) into the vessel.

9. The device of claim 7, wherein the resistivity sensor is immersed within the deionized water within the vessel.

10. The device of claim 7, wherein the resistivity sensor comprises an elongated probe assembly formed of a metal probe, an insulating sleeve circumferentially surrounding a length of the metal probe, a plastic fitting that circumferentially surrounds one end of the plastic sleeve and a length of the metal probe and a connector that circumferentially surrounds and mates to a portion of the plastic fitting.

11. The device of claim 1, wherein the vessel includes an internal sensor for measuring a liquid level within the vessel, the internal sensor being suspended within the vessel and coupled to a top cap that mates with the vessel.

12. The device of claim 1, wherein the resistivity sensor comprises an elongated probe assembly including a metal probe and an insulating sleeve circumferentially surrounding a length of the metal probe with a distal tip of the metal probe being exposed and free of the insulating sleeve, wherein the device is configured such that a voltage is applied to the metal probe and a signal is returned off a wall of the vessel, the resistivity sensor is configured such that an electrical insulator in the form of insulating sleeve is designed into a base of the metal probe to thereby increase a length of a shortest electrical path, whereby probe sensitivity is improved as a result.

13. The device of claim 1, wherein the resistivity sensor is disposed within a main conduit of the outlet, the main conduit being open along a top face of the manifold such that the first fluid directly flows from a hollow interior of the vessel into the main conduit of the outlet.

14. The device of claim 13, wherein the resistivity sensor is positioned in axial alignment with the opening along the top face so as to position the resistivity sensor in close proximity to the hollow interior of the vessel.

15. The device of claim 14, wherein the resistivity sensor comprises an elongated probe assembly including a metal probe, an insulating sleeve and an insulating base section that surrounds one end of the insulating sleeve so as to position the one end of the insulating sleeve between the metal probe and the insulating base section, wherein the insulating sleeve circumferentially surrounds a length of the metal probe, whereby only a distal tip of the metal probe is left exposed.

16. The device of claim 15, wherein the insulating base section is securely coupled to the manifold structure.

17. A method for reducing resistivity of a first fluid comprising the steps of:

delivering the first fluid through a first inlet to an interior of a vessel;

selectively delivering a second fluid through a second inlet to the vessel for mixing with the first fluid to cause a reduction in the resistivity of the first fluid;

measuring the resistivity of the first fluid in the vessel and controlling the delivery of the second fluid to the vessel based on measured resistivity values; and discharging the first fluid from the vessel through an outlet associated therewith when the resistivity value of the first fluid is at a predetermined target value or within a predetermined target range;

wherein the first inlet, the second inlet and the outlet are integrally formed in a body of a bottom cap that is mated to an open end of the vessel to close off the vessel and the resistivity is measured by a resistivity sensor that has an exposed distal tip that is disposed within the outlet in contact with the first fluid contained in the vessel and is securely attached to the bottom cap.

18. The device of claim 1, wherein the outlet of the manifold structure includes a first portion that faces an open interior of the vessel and a second portion that faces directly outward from the vessel, the manifold structure includes an opening that receives the resistivity sensor and is in communication with the outlet such that a distal end of the resistivity sensor is located in the first portion of the outlet.

19. The device of claim 18, wherein a center longitudinal axis of the first portion and a center longitudinal axis the resistivity sensor are coaxial.

* * * * *